United States Patent [19]

Aumiaux

[11] 3,748,587

[45] July 24, 1973

[54] CONTINUOUS AMPLIFIER ASSEMBLY WITH DRIFT CORRECTION

[75] Inventor: Michel Aumiaux, Nantes, France

[73] Assignee: Societe D'Etudes, Recherches Et Constructions Electroniques S.E.R.C.E.L., Atlantique, France

[22] Filed: Apr. 21, 1972

[21] Appl. No.: 246,494

Related U.S. Application Data

[63] Continuation of Ser. No. 7,071, Jan. 30, 1970.

[30] Foreign Application Priority Data

May 21, 1969 France .............................. 6916512

[52] U.S. Cl. ........................ 330/9, 330/24, 330/35

[51] Int. Cl. .............................................. H03f 1/02

[58] Field of Search .................................. 330/51, 9

[56] References Cited

UNITED STATES PATENTS 2,994,825 8/1961 Anderson ........................... 328/129

*Primary Examiner*—Nathan Kaufman

*Attorney*—Oberlin, Maky, Donnelly & Renner

[57] ABSTRACT

An amplifier assembly for amplifying weak DC signals and having means for drift correction. The assembly includes commutating devices for causing it to operate cyclicly in two distinct operating modes, alternately of short and long duration. In the short sampling modes when the assembly input is zero, the drift of a first amplifier stage is sampled and stored in a memory and the assembly output is disconnected from the load. During the longer alternate modes when the DC input is applied to the first amplifier stage, the assembly output is connected to the load, the previously stored signal is supplied as a drift correction signal to one input of a differential input amplifier stage, and the other differential stage input is connected to the first stage output. The output of the differential amplifier stage yields the final output from the assembly; when such output is disconnected from the load during the short sampling modes, the value thereof is maintained across the load from a second memory charged from the assembly output during the previous longer mode.

6 Claims, 5 Drawing Figures

CONTINUOUS AMPLIFIER ASSEMBLY WITH DRIFT CORRECTION

This is a continuation, of application Ser. No. 007,071, filed Jan. 30, 1970.

The present invention relates to the amplification of direct current (DC) low-level electrical signals, and more particularly to the correction of drift of an amplification assembly for DC low-level signals.

The amplification of weak DC signals (a little above noise level) originating from pick-ups such as thermocouples and strain gauges is increasingly more frequently required by virtue of the increasing automation of industrial processes. For such amplfication to be achieved in a satisfactory manner, it is desirable to have amplifiers which, among other characteristics, exhibit the following two features:

- a very low drift from zero as a function of time and temperature, and
- a very low peak-to-peak noise for a broad passband.

In the present state of the art, these two qualities — low drift and low noise — are incompatible for the production of amplification assemblies for DC low-level signals. Indeed, according to a first known technique for providing such amplifier assemblies, the DC signals are transformed into periodic signals by means of a so-called "chopper" device, and the periodic signals thus produced are amplified; this technique provides for a very low drift in the long term, but a very high noise level by virtue of the peaks of voltage due to commutation at the frequency of the periodic signals. According to a second known technique for providing such amplifier assemblies, silicon transistors are used which are perfectly matched electrically and thermally so that the fluctuations in their characteristics are mutually compensating; this technique results in low noise and low thermal drift from zero, but the long-term drift from zero remains considerable and impossible to control.

The present invention provides a method for correcting the drift of an amplifier, making it possible to obtain, in an amplifier assembly for DC weak signals, a combination of advantages which it was hitherto impossible to obtain simultaneously; that is to say, very small drift, very low noise and also very small input current, very small input capacity and very high input impedance.

According to the invention, an amplifier assembly for DC low level signals comprises means for regulating the zero of DC amplifier, that is, compensating for the drift thereof as by reducing the drift to substantially zero, and commutation means. Preferably the assembly also includes additional means for maintaining the output voltage substantially constant during short periods in which the drift is sampled, as described below.

The means for regulating the zero, i.e., the drift correction means, and the output voltage maintaining means each comprise an analogue memory, e.g., a capacitor, an a input gating circuit for the memory and an output gating circuit for making use of the stored signal in the memory, the commutation means controlling the functioning of the said circuits.

The regulable zero DC amplifier comprises at least one first high voltage gain amplifier stage, and a second amplifier stage with two differential inputs. One of these two inputs is connected to the output of the first stage and to the input gating circuit of the regulating means, the other of these two inputs being connected to the output gating circuit of the regulating means. Preferably, a third amplifier stage is provided, the input of which is connected to the output of the second stage. Commutating means are connected in series with and in parallel to the input of the first amplifier stage and in series with the output of the amplifier.

The voltage maintaining means is connected in parallel to the output from the third amplifier on the downstream side of the aforementioned commutating means.

The amplifier assembly also comprises at least one pair of input terminals to which the signal which is to be amplified is fed, and a pair of output terminals by which the amplified signal can be applied to a load.

The manner in which the amplifier assembly according to the invention functions is to provide two modes of unequal duration which are repeated in periodic alternation.

In the first mode occupying almost the entire duration of the repetition cycle, the amplifier converts a DC voltage fed to the input terminals into an amplified DC voltage available at the output terminals and applied to a load, the zero of the amplifier being regulated by the output gating circuit of the regulating means as a function of the value of a voltage stored in the first memory during the course of the preceding mode, and the voltage at the output terminals being stored in the second memory by the memory input gating circuit of the voltage maintaining means.

In the second mode, which should be as short as allowed by the time constants of the amplifier and of the zero regulating means, the input of the amplifier is short-circuited, the memory input gating circuit of the zero regulating means registers in the first memory a voltage corresponding to the drift of the first amplifier stage, and simultaneously the voltage at the output terminals is maintained by the memory output gating circuit of the voltage maintaining means at the value stored in the second memory during the course of the preceding mode.

As necessitated by each of the aforesaid modes, connections are made and broken by means of commutating means incorporated into the appropriate connections of the amplifier assembly, these commutating means being controlled to open or close the desired circuits simultaneously by any known synchronous control means.

These commutating means are preferably semiconductor devices, for example field-effect transistors, so as to obtain easy control of commutation, which is simultaneous and without rebound; however, it must be understood that any other commutating means which opens or closes the appropriate circuits is likewise within the scope of the invention.

In the amplifier assembly according to the invention, it is advantageous for a feed-back loop to connect the input of the first amplifier stage to the output of the last amplifier stage so as to stabilise the gain and allow regulation of this gain by influencing the feed-back rate. Preferably, the first stage of the amplifier is a differential input and high impedance stage; the signals to be amplified are applied to one of the paths of this differential input; the signals emerging from the last amplifier stage are of the same polarity as the signals to be amplified and are applied on the one hand to the load and on the other to the other path of the differential input after division according to a suitable factor which determines the feed-back rate.

A specific embodiment for carrying the invention into effect will now be described by way of example with reference to the accompanying drawings, in which.

Figure 1:
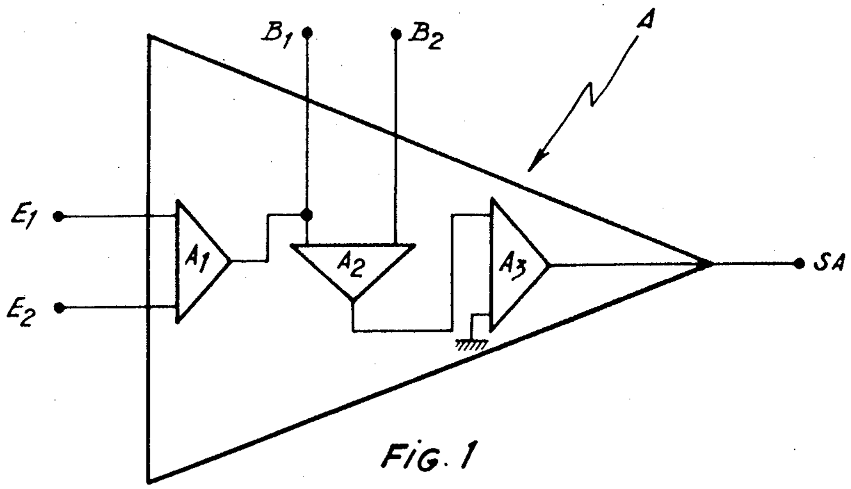
FIG. 1 is a diagram of a DC amplifier with regulable zero, i.e., drift correction, according to the invention.

FIG. 1 shows an amplifier for DC signals, generally designated A. This amplifier A comprises a first stage $A_1$ with differential input and high voltage gain, an intermediate stage $A_2$ with differential input, and a final stage $A_3$ for high power gain, used with a non-differential input. The two differential input paths $E_1$ and $E_2$ of the first stage $A_1$ constitute the input paths of the amplifier A. The output path of the first stage $A_1$ is connected to one of the input paths of $B_1$ of the second stage $A_2$. The two input paths $B_1$ and $B_2$ of the second stage are connected to means which will be explained with reference to FIG. 3. The output path of the second stage $A_2$ is connected to the input path of the final stage $A_3$, and the output path SA of the final stage $A_3$ constitutes the output of the amplifier A.

Figure 2:
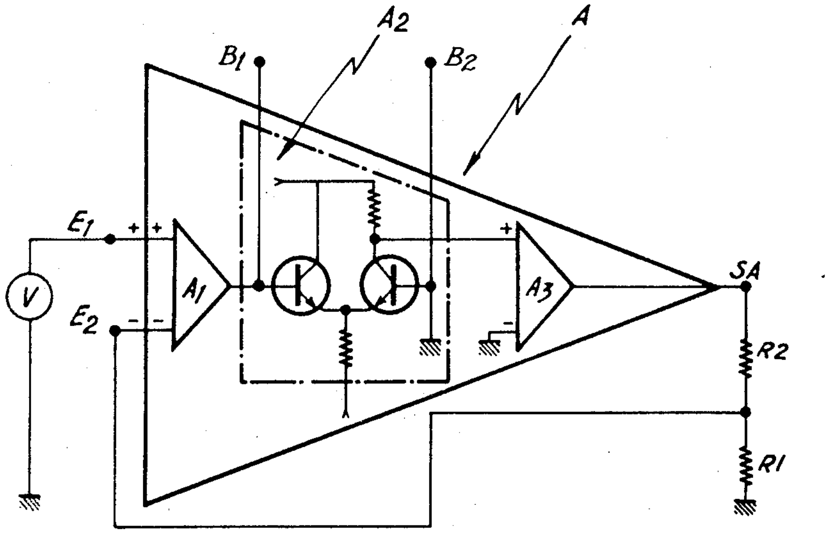
FIG. 2 is a diagram of the amplifier in FIG. 1, showing in more detail one form of intermediate stage of the amplifier.

FIG. 2 shows in greater detail certain parts of the amplifier A shown in FIG. 1, as well as its external electrical connections. In the amplifier A, the first stage $A_1$ and the final stage $A_3$ have been represented as in FIG. 1; the intermediate stage $A_2$, in the embodiment illustrated, comprises a pair of emitter-coupled transistors, the input paths $B_1$ and $B_2$ of this stage each being connected to the base of one of the transistors and the output path being connected to the collector of one of the transistors. In FIG. 2, V diagrammatically illustrates the source of the DC voltage which is to be amplified, this source being connected to the input $E_1$. The input $E_2$ is connected to a feed-back system comprising resistances $R_1$ and $R_2$ connected to the output path SA as shown in the drawing. With such a feed-back loop, the gain of the amplifier A tends towards a value equal to $[(R_1 + R_2) / R_1]$ if the gain of stage $A_1$ is sufficient, for example of about 500 or 1000, which is well known in the art.

Figure 3:
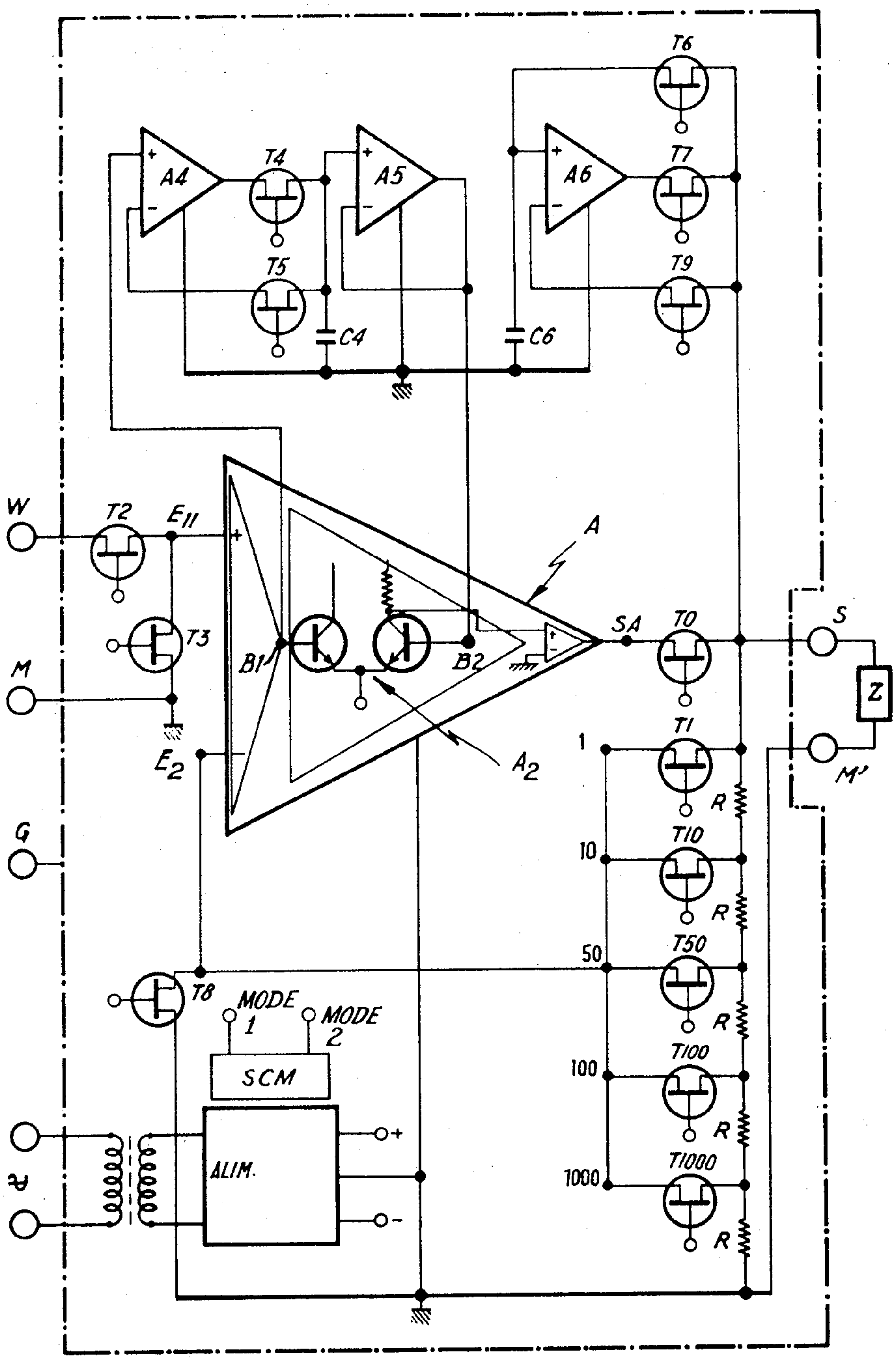
FIG. 3 shows a detailed diagram of an amplifier assembly according to the invention.

FIG. 3 shows an amplifier assembly bounded by a frame of chain lines which also represents electrical screening connected to a terminal G. The voltage to be amplified is applied between a terminal W and a ground connection M. The amplified voltage is available between a terminal S and a ground connection terminal M' and can be applied to a load Z. The electrical supply to the amplifier assembly is represented by the means designated ALIM., and the synchronous control means is designated SCM.

The items designated $T_1$ to $T_{10}$ and $T_{50}$, $T_{100}$ and $T_{1000}$ are commutating means cyclicly operated by the synchronous control means and capable of breaking the circuit in which they are placed. In the example illustrated, these means are field-effect transistors, but any equivalent commutating means may be used. The effect of these means will be explained hereinafter with reference to FIGS. 4 and 5.

The amplifier assembly comprises the amplifier A as already described with reference to FIG. 2, a zero regulating means for correcting the amplifier assembly drift comprising differential amplifiers $A_4$ and $A_5$ and a memory capacitor $C_4$, a voltage maintaining means comprising a differential amplifier $A_6$ and a memory capacitor $C_6$, and resistors all designated R and which together constitute the resistors of the feed-back system designated $R_1$ and $R_2$ in FIG. 2.

With the capacitor $C_4$, the amplifiers $A_4$ and $A_5$ form an apparatus known as a sample and hold circuit, in the same way as the amplifier $A_6$ and the capacitor $C_6$. These amplifiers are connected so as to function as power amplifiers with an essentially unitary voltage gain.

Figure 4:
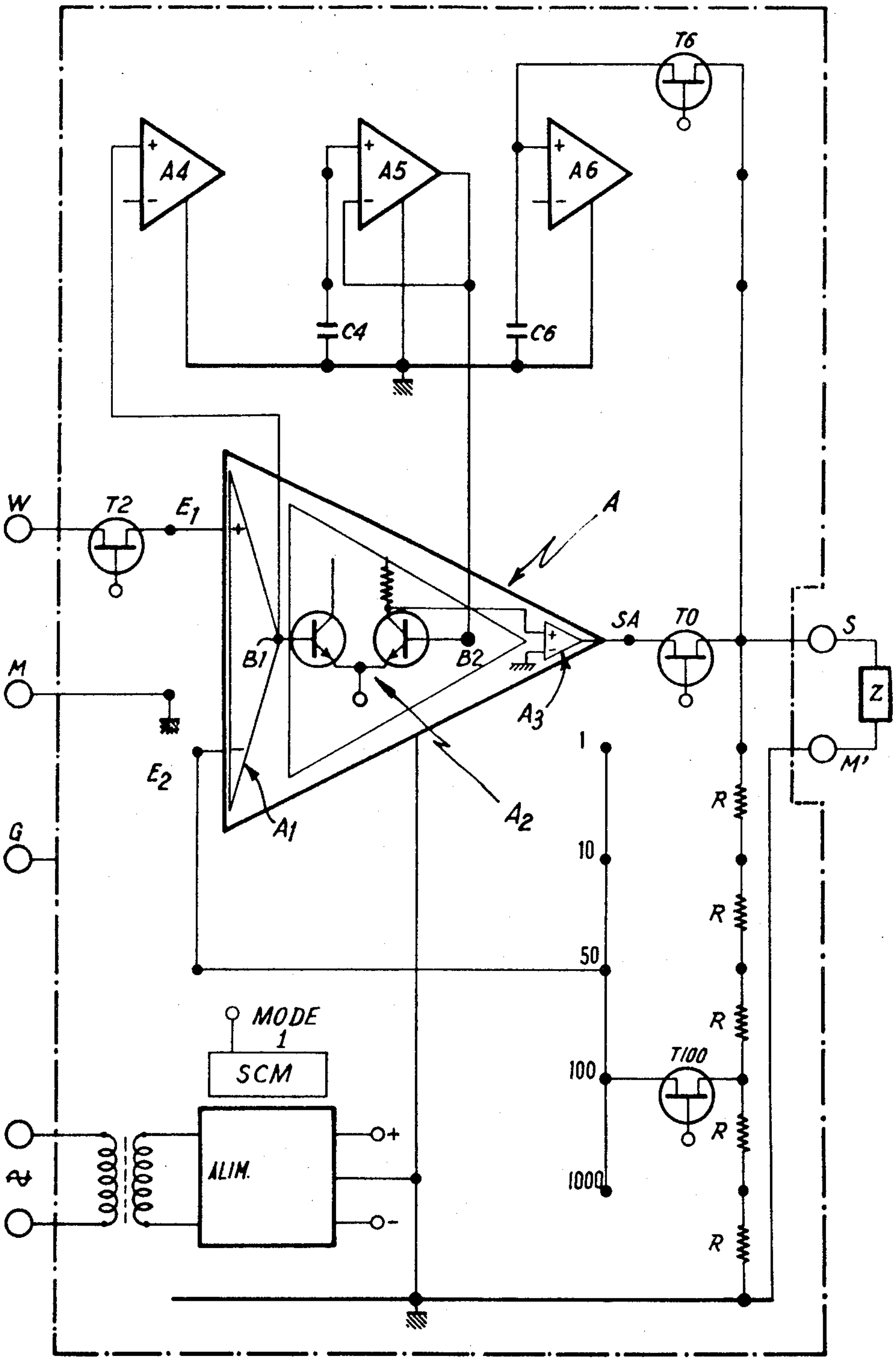
FIG. 4 shows the part of the diagram in FIG. 3 which comes into operation during the first mode of operation of the amplifier assembly.
Figure 5:
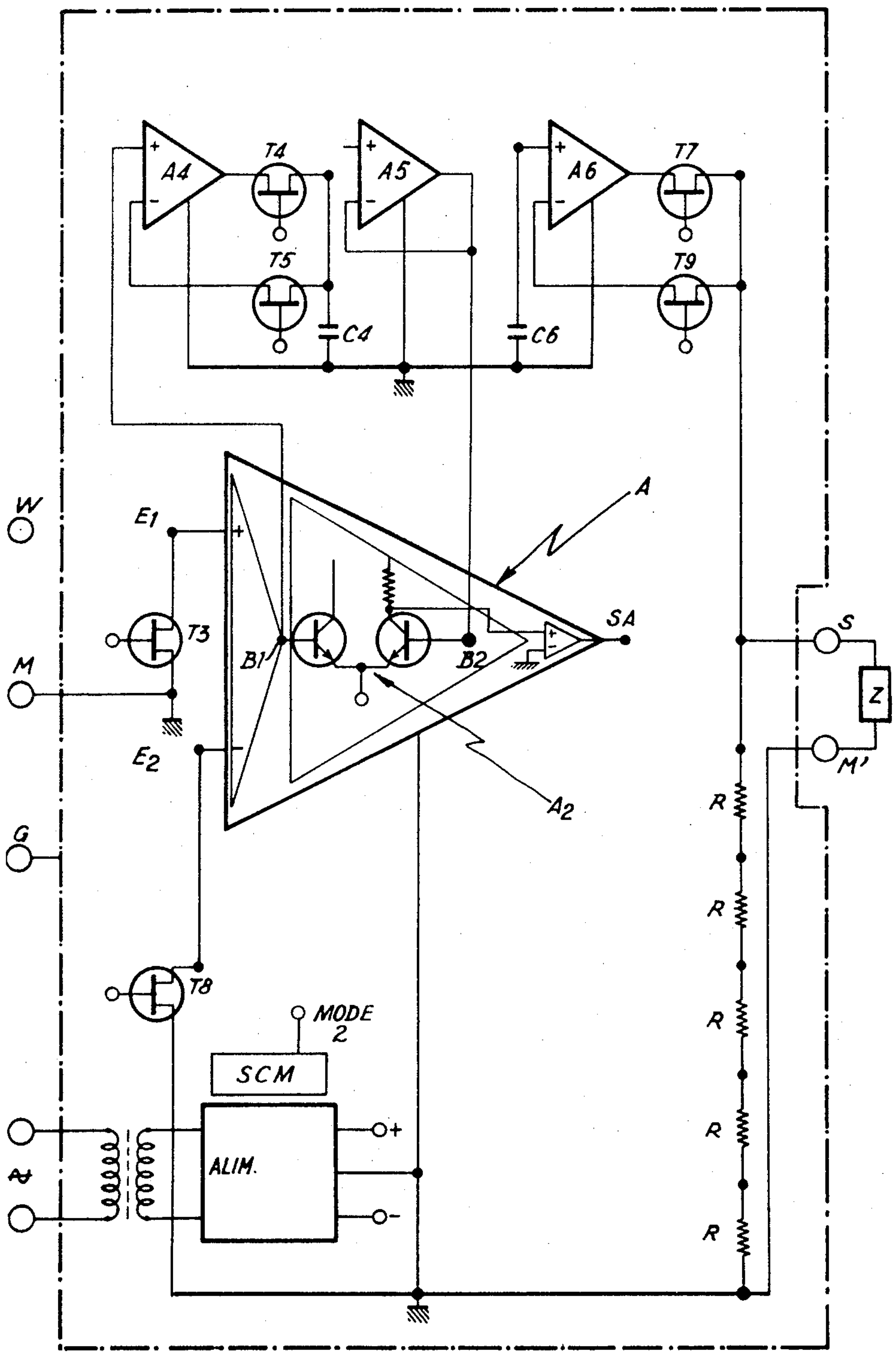
FIG. 5 shows the part of the diagram in FIG. 3 which comes into operation during the second mode of operation of the amplifier assembly.

The purpose of the elements illustrated in FIG. 3 will now be explained with reference to FIGS. 4 and 5. Each of these drawings corresponds to one of the operating means of the amplifier assembly; in other words a first or amplifying mode which is shown in FIG. 4, and a second or drift correcting mode shown in FIG. 5. FIGS. 4 and 5 are derived from FIG. 3 in that the connecting and commutating elements not involved in the respective mode are deleted from the drawing: in particular, the commutating means which are in a "non-conductive" state, that is to say they break the circuits in which they are located, have been deleted. Conversely, all the commutating means illustrated in FIGS. 4 and 5 are in a "conductive" state and do not break the circuits in which they are placed.

In the diagram of FIG. 4, only the commutating means $T_0$, $T_2$, $T_6$, $T_{100}$ are in the conductive state. In the diagram of FIG. 5, only the commutating means $T_3$, $T_4$, $T_5$, $T_7$, $T_8$, $T_9$ are in the conductive state. As will be explained hereinafter, the commutating means $T_1$, $T_{10}$, $T_{50}$, $T_{100}$, $T_{1000}$ play similar parts and the commutating means $T_{100}$ is illustrated by way of explanation of the role played by one of them.

In FIG. 4, the input connection terminal W of the amplifier assembly is connected to the input path $E_1$ of the amplifier A; the output path SA of the amplifier A is connected to the output connection S to which is connected the load Z, and to the resistance system R. One of the commutating means $T_1$, $T_{10}$, $T_{50}$, $T_{100}$, $T_{1000}$ is in the conductive state and connects one point of the resistance system R to the input path $E_2$ of the amplifier A so as to form a feed-back loop; in the example shown, the commutating means which is rendered conductive is $T_{100}$. According to the values of the resistance system R and the choice of the commutating means which is made conductive, the feed-back rate assumes a value which determines the gain of the amplifier assembly in a known manner. The amplifier assembly illustrated by way of example can function with a voltage gain of 1, 10, 50, 100 or 1000, the values of the resistances R being calculable by known techniques.

It can be seen from FIG. 4 that the terminal S is also connected to the capacitor $C_6$ through transistor $T_6$ and is therefore charged at the voltage of the terminal S.

Moreover, the voltage corresponding to the charge accumulated during the drift correcting mode in the capacitor $C_4$ is transmitted with a collective gain by the amplifier $A_5$ to the input path $B_2$ of stage $A_2$ of the amplifier A, which stage $A_2$ amplifies the difference in the voltages between the input paths $B_1$ and $B_2$, which is equivalent to regulating the "zero" of the amplifier stage $A_2$ to the level of the voltage of $C_4$. The current which the capacitor $C_4$ supplies to the amplifier $A_5$ is sufficiently weak that it does not discharge the capacitor $C_4$ except to a negligible degree, owing to the high input impedance of the amplifier $A_5$.

Consequently, in the first mode of functioning of the amplifier assembly, the voltage applied to the input terminal W is amplified and applied to the output terminal S and to the load Z. The zero of the amplifier A is regulated by the voltage applied at $B_2$ by the capacitor $C_4$ and the amplifier $A_5$. Since the $C_4$ voltage is derived from the drift voltage of amplifier $A_1$, the effect is to compensate for the drift voltage apparent at $B_1$ during the preceding mode, as hereinafter described. Simultaneously, the output voltage at the terminal S is stored in the memory comprising the capacitor $C_6$.

In FIG. 5, the input paths $E_1$ and $E_2$ of the amplifier A are connected to each other and grounded, i.e., effectively at zero potential. The input path $B_1$ of the intermediate stage $A_2$ of the amplifier A is then brought to a voltage which is due to the drift of the first stage $A_1$. This voltage is transmitted with unitary gain to the capacitor $C_4$ by the amplifier $A_4$ so as to charge the capacitor $C_4$ to the value of this voltage. Simultaneously, the output terminal S is disconnected from the output path SA of the amplifier A but remains connected through transistor $T_7$ to the part of the voltage maintaining means which is constituted by the capacitor $C_6$ and the amplifier $A_6$, so that the voltage at the terminal S is maintained equal to the voltage of the charge of the capacitor $C_6$.

Consequently, in the second mode of the functioning of the amplifier assembly, the terminal S is maintained at the same voltage as at the end of the preceding mode, while the output SA of the amplifier A is disconnected from this terminal S. Simultaneously, the inputs $E_1$ and $E_2$ of the amplifier A are short-circuited and the drift voltage of the first stage $A_1$ appears at $B_1$ and is stored in the memory capacitor $C_4$.

The first and the second modes are repeated alternately and periodically under control of the synchronous control means SCM, the duration of the second mode being brief compared with that of the first mode. By way of example, the repetition cycle may be of the order of 1 to 10 seconds, the second mode lasting less than 1 percent of the duration of the first mode. Commutation from one mode to the other is obtained by the simultaneous actuation of the commutating means in the suitable direction to obtain the respective diagrams shown in FIGS. 4 and 5. In the examples described, the commutating means are field-effect transistors, the simultaneous control of which by suitable synchronous control means is known in the art.

By virtue of applying an effective drift correction to the amplifier assembly according to the invention, it is possible to use high impedance devices, for example field-effect transistors, at the inputs $E_1$ and $E_2$ of the amplifier. The correction of drift is necessary only for the first amplifier stage, the drift of which is multiplied by the gain of the following stages; the lesser gain of the following stages results in a drift which can be disregarded.

One of the important advantages of the invention is that the current delivered to the load is at no time interrupted, not even at the moment of drift correction. The disturbance introduced into the signal applied to the load by this correction is extremely low and is manifest as a parasite peak of a few tens of microvolts for a few microseconds, with a repetition frequency of 1 to 0.1 Hz. As compared with previously-known drift stabilising means, based on the use of "choppers," the amplitude of parasite voltage peaks superimposed on the output signal is thus reduced by a factor of 10 to 50, and the frequency of these peaks is reduced by a factor of more than 100,000.

What we claim as our invention and desire to secure by Letters Patent is:

1. A drift compensated amplifier assembly for weak DC voltage signals comprising a DC amplifier and drift correcting means, said DC amplifier comprising a first high voltage gain differential amplifier stage with a first input for said DC signals and a second input, and a second amplifier stage having differential first and second inputs, the first input of said second amplifier stage being connected to the output of said first amplifier stage; said drift correcting means comprising an analogue memory, a first gating circuit connected to said first amplifier stage output and to said memory for enabling the storing of a voltage from said output of said first amplifier stage in said analogue memory, a second gating circuit connected to said memory and to the second input of said second amplifier stage for enabling supply of the memory stored voltage to said second input of said second amplifier stage, a third gating circuit connecting said first input of said first amplifier stage to ground thereby enabling a zero input voltage, and a fourth gating circuit connected between the output of the DC amplifier and the second input of the first amplifier stage for establishing a negative feedback connection; and control means for synchronously controlling said gating circuits cyclicly, said control means operating said first gating circuit for storing in said memory a voltage sampled out of the signal at said output of said first amplifier stage while simultaneously operating said third gating circuit to maintain the input of said first amplifier stage at zero voltage, thus providing a memorized drift correction voltage, and thereafter operating said second gating circuit for causing the voltage at said second input of said second amplifier stage to be said memorized drift correction voltage while simultaneously operating said fourth gating circuit for establishing said negative feedback connection until the next sampling when said first amplifier stage input is again zero.

2. An amplifier assembly according to claim 1 in which said analogue memory comprises a capacitor.

3. An amplifier assembly according to claim 2 in which at least one of said gating circuits consists of a high input impedance amplifier of essentially unit gain.

4. An amplifier assembly according to claim 1 in which said gating circuits comprise electronic devices having no moving parts.

5. An amplifier assembly according to claim 4 in which said electronic devices are field effect transistors.

6. An amplifier assembly according to claim 1 further comprising an output terminal for said amplifier assembly and an output terminal for said DC amplifier, a fifth gating circuit connected in series between said output terminals, said control means operating said fifth gating circuit for connecting said output terminals while a DC input is applied to said first input of said first amplifier stage and for disconnecting said output terminals while a zero input is applied to said first input of said first amplifier stage, and output voltage maintaining means, said output voltage maintaining means comprising an analogue memory, a sixth gating circuit operated by said control means for storing the output voltage of said DC amplifier in said last named memory when said output terminals are connected, and a seventh gating circuit operated by said control means for supplying the stored voltage in said last named memory to the amplifier assembly output terminal during the zero input sampling when said output terminals are disconnected.

* * * * *